(12) United States Patent
Neier et al.

(10) Patent No.: US 8,342,738 B2
(45) Date of Patent: Jan. 1, 2013

(54) VERTICAL MIXER WITH DEFLECTORS

(75) Inventors: Rodney R. Neier, Dodge City, KS (US); Allin L. Butcher, Dodge City, KS (US); Ross M. Groening, Dodge City, KS (US); Conway B. Price, Ensign, KS (US)

(73) Assignee: Roto-Mix, LLC, Dodge City, KS (US)

( * ) Notice: Subject to any disclaimer, the term of this patent is extended or adjusted under 35 U.S.C. 154(b) by 1191 days.

(21) Appl. No.: 12/021,603

(22) Filed: Jan. 29, 2008

(65) Prior Publication Data
US 2009/0190440 A1    Jul. 30, 2009

(51) Int. Cl.
*B01F 7/00* (2006.01)
*A01D 34/00* (2006.01)
*B02B 5/02* (2006.01)

(52) U.S. Cl. ........ 366/314; 366/603; 366/299; 366/297; 366/323; 366/305; 366/302; 366/301; 241/101.76; 241/101.761

(58) Field of Classification Search .................. 366/314, 366/603, 299, 297, 323, 305, 302, 301; 241/101.76, 241/101.761
See application file for complete search history.

(56) References Cited

U.S. PATENT DOCUMENTS

| | | | | |
|---|---|---|---|---|
| 3,156,451 A | * | 11/1964 | Waas | ............................. 366/314 |
| 5,409,313 A | * | 4/1995 | Funk | ............................. 366/307 |
| 5,462,354 A | | 10/1995 | Neier | |
| 5,553,937 A | | 9/1996 | Faccia | |
| 5,553,938 A | | 9/1996 | Faccia | |
| 6,409,377 B1 | | 6/2002 | Van Der Plas | |
| 6,467,945 B1 | * | 10/2002 | Albright et al. | ............... 366/196 |
| 6,983,902 B2 | | 1/2006 | Faccia | |
| 7,118,268 B2 | | 10/2006 | Van Der Plas | |

* cited by examiner

*Primary Examiner* — Nathan Bowers
(74) *Attorney, Agent, or Firm* — Mckee, Voorhees & Sease, P.L.C.

(57) ABSTRACT

A mixer includes a housing having one or more augers therein. The augers are turned so that they lift the material being mixed upwardly. Fixed on the side walls, which include baffles, are one or more deflectors which impart a downward motion on the mixture being mixed so that the mixture is tumbled upwardly by the augers and downwardly by the deflectors.

18 Claims, 7 Drawing Sheets

VERTICAL MIXER WITH DEFLECTORS

BACKGROUND OF THE INVENTION

The present invention relates to a vertical mixer with deflectors. The deflectors are on the side walls and deflect the material being mixed downwardly whereas the augers propel the material being mixed in an upward direction.

Counter cutters have been provided on the interior of the chamber, but these counter cutters do not deflect the material downwardly as in the present invention. Examples of prior art showing these counter cutters are shown in Faccia U.S. Pat. Nos. 5,553,937; 5,553,938; and 6,983,902. These show counter cutters that are resistant to the movement of the rotational direction imparted on the material by the augers. However, they do not respond by pushing the material downward, but instead resist the movement of the material in a circumferential direction. Furthermore, these cutting devices are pivoted and include a hydraulic cylinder on the outer surface thereof. They are pivoted about a horizontal axis, and protrude through side walls of the mixer into the interior of the mixer. Because they are vertically oriented, and because they protrude through a slotted opening in the sides of the side walls of the mixer, they create an ability of the mixer to resist the movement of the direction in a circumferential direction and the slots also cause material being mixed to fall through the slots of the mixer.

It has been found that imparting a downward movement to the material being mixed with deflectors that are positioned on the side walls of the mixer, creates a mixing action that is superior to the prior art. Therefore an object of the present invention is the provision of an improved vertical mixer having one or more deflectors projecting the material downwardly.

A further object of the present invention is the provision of one or more deflectors which are fixed to the side walls of the mixer and resist the upward movement of the material caused by the rotation of the augers.

A further object of the present invention is the provision of a mixer which includes one or more deflectors that are fixed to the side walls of the mixer and extend downwardly so as to impart a downward motion in response to the upward motion created by the augers.

A further object of the present invention is to improve the rate of discharge of the material, especially bulky material through the discharge opening.

A further object of the present invention is to cause the material to be deflected downward toward the discharge opening.

A further object of the present invention is the provision of an improved mixer which does not include openings in the side walls of the mixer.

A further object of the present invention is the provision of one or more deflectors which project the material downwardly and which are not pivoted to the side walls of the mixer.

A further object of the present invention is the provision of one or more deflectors which impart a downward movement to the material being mixed and which are attached to the side walls of the mixer. The sidewalls may include a baffle which protrudes inwardly from the sides of the mixer.

BRIEF SUMMARY OF THE INVENTION

The foregoing objects may be achieved by a vertical mixer comprising a housing having a continuous side wall and a bottom wall forming a mixer chamber therein, the housing having a front end, a rear end, and a top end. A material is within the mixing chamber. At least one vertical auger is within the housing and is adapted to rotate about a vertical axis in an upward direction that causes the material within the housing to move toward the top end of the housing. A mechanism is provided for rotating the at least one vertical auger about the vertical axis in the upward direction. A deflector is within the housing attached to the side wall and positioned to cause downward movement to be imparted to the material towards the bottom wall within the housing in response to the movement of the material towards the top end imparted by the vertical auger.

According to another feature of the present invention, a door opening is provided therein having an upstream side and a downstream side relative to the rotation of the auger within the mixer chamber. The deflector is positioned within the housing adjacent the upstream side of the door opening.

According to another feature of the present invention, the door opening is in one of the front and rear ends of the mixer housing, and the deflector is within the housing adjacent the upstream side of the door opening.

According to another feature of the present invention, the door opening is located in the side wall of the mixer housing adjacent one of the front or rear ends thereof.

According to another feature of the present invention, the side wall of the housing includes at least one baffle and the deflector is attached to the baffle.

According to another feature of the present invention, two augers are provided within the mixer housing and the deflector is provided to deflect the material downwardly in resistance to the upward lifting of the material caused by the flighting on the first and second augers.

According to the method of the present invention, the mixing material is within the housing having a front end, a rear end, a top, a side wall, and a bottom wall forming a mixing compartment. The method comprises placing the material within the mixing compartment. Then the material is moved upwardly toward the top of the housing within the compartment by rotating one or more of the augers. The material is downwardly deflected within the compartment with at least one deflector that is attached to the side wall of the housing.

DETAILED DESCRIPTION OF THE PREFERRED EMBODIMENT

Figure 6:
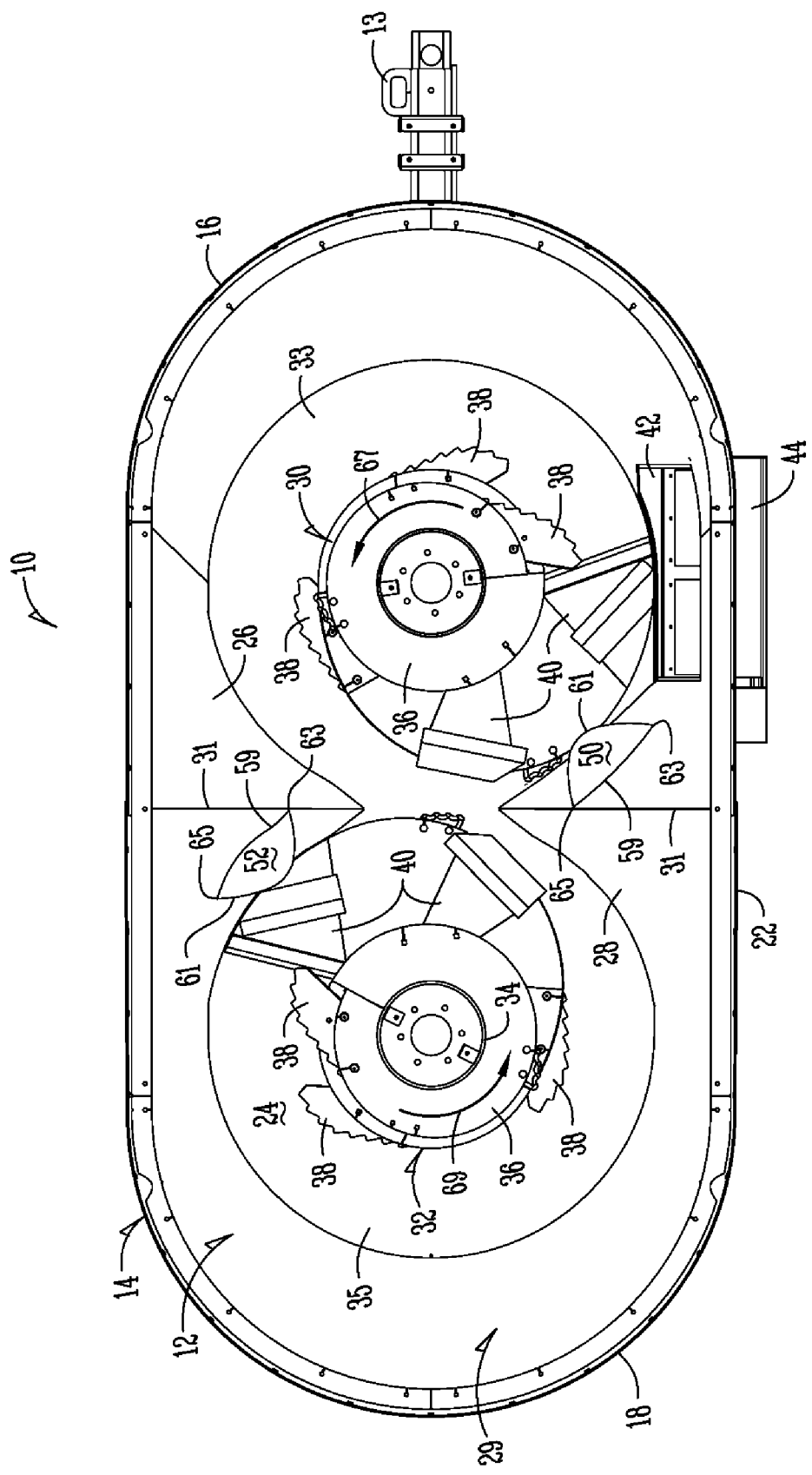
FIG. 6 is a top view of the mixer of the present invention.

Referring to FIGS. 1-6, a vertical mixer 10 is shown. Mixer 10 includes a mixer housing 12 having a tongue 13 (FIG. 6). Mixer housing 12 includes a plurality of side walls 14 comprising a front wall 16, a rear wall 18, a left hand wall 20 (as viewed facing the direction of the tongue 13), and a right hand wall 22. A bottom wall 24 is also provided on the mixer housing and a vertical left hand baffle 26 and a vertical right hand baffle 28 are included in the side walls. The baffles 26, 28 extend inwardly toward the center of the mixing chamber 29. They are each provided with a vertical line 31 which designates a ridge formed on each of the baffles 26, 28. The baffles 26, 28 protrude inwardly to form two chambers 33, 35 which are in communication with one another, but 5 which are circular in shape.

A first auger 30 is provided in chamber 33, and a second auger 32 is provided in chamber 35. The augers 30, 32 include helical flightings 36 thereon which reduce in circumference from the lower ends toward their upper ends as can be readily seen in FIG. 1. An auger shaft 34 extends upwardly and is vertical in its orientation and the augers 30, 32 pivot about the vertical axis provided by the shaft 34. Mounted on the flightings 36 of the augers are a plurality of cutting blades 38 and a plurality of kicker bars 40. (FIG. 6).

A door opening 42 is provided in the right hand view as viewed from facing the tongue 13. Door opening 42 includes a door 44 (FIG. 5), tracks 46, and hydraulic cylinders 48 which are connected at their opposite ends to the door gate 44 and the side walls 14 of the mixer. While door 44 may be varied in its design without detracting from the invention, but the important thing is that door 44 includes a door opening 42 and a moveable gate 44.

A door side deflector 50 is provided immediately adjacent the upstream end of the door opening 42 and is attached to the side walls. Preferably, the first deflector 50 is positioned at right hand baffle 28 upstream from door 44, but it may be attached at any place to the side wall 14 within first chamber 33.

Similarly, an additional side deflector 52 is mounted adjacent the opposite baffle 26. Deflector 52 may be positioned at any place in the second chamber 35, of the attached at the side walls 14 in any position within the second chamber 35. Furthermore, additional deflectors 50, 52 may be positioned on side walls 14.

Figure 1:
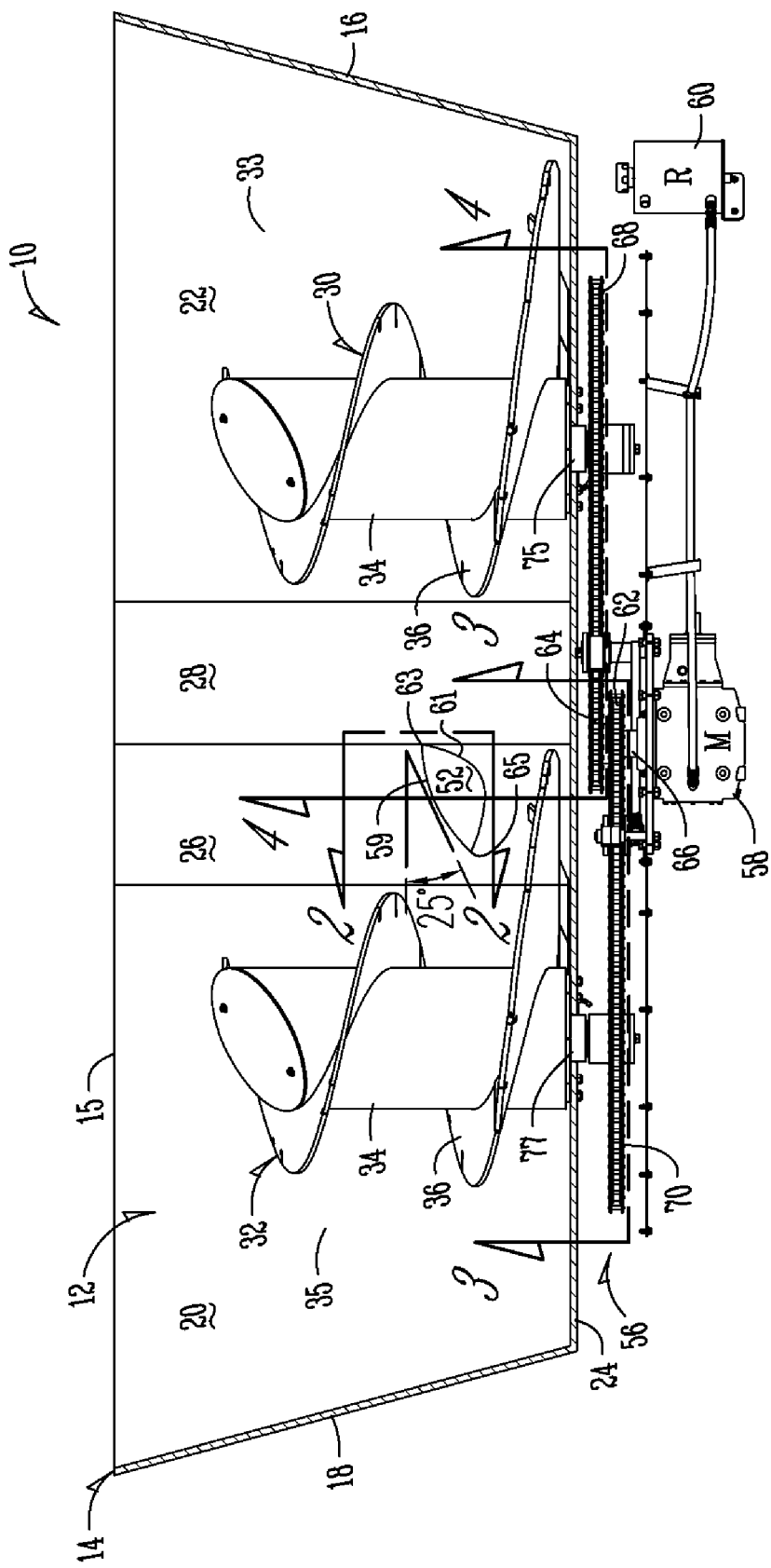
FIG. 1 is a sectional view of the mixer of the present invention.
Figure 2:
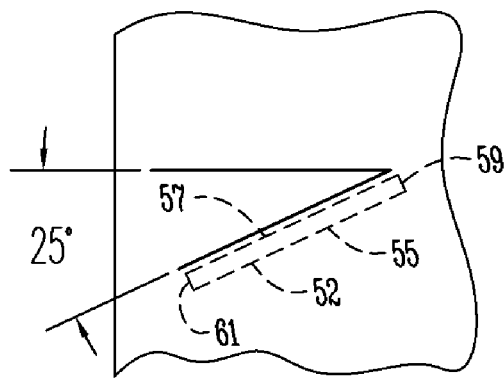
FIG. 2 is a sectional view taken along line 2-2 of FIG. 1.

The angles of additional deflector 52 are shown in FIG. 1 similarly in FIG. 2. In FIG. 1, the deflector 52 is shown at a 25 degree angle side to side position. The first side 63 at which the auger turns is higher than the second side 65 furthest from the way the auger turns.

In FIG. 2, the lower edge 61 of the deflector 52 is below the upper edge 59 of the deflector 52 and the preferable angle is 25 degrees. Non-door side deflector 52 includes an upper surface 57 and a lower surface 55. Deflector 50 is also at the same angle. However, both of the angles (side to side in FIG. 1, and upper to lower as shown in FIG. 2) may be varied depending upon the particular application.

Figure 3:
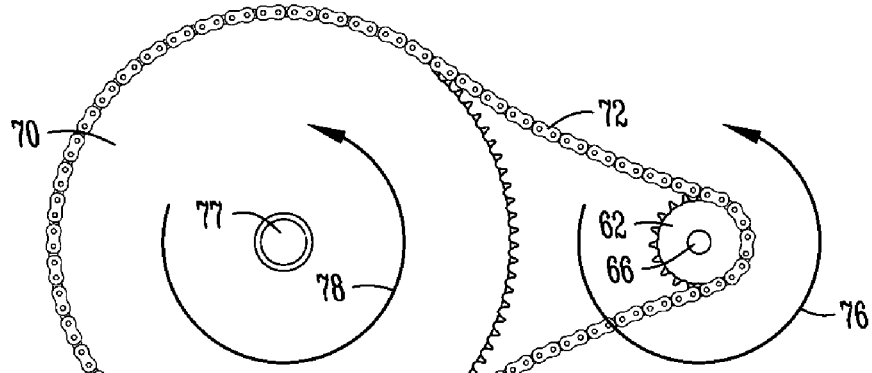
FIG. 3 is a sectional view taken along line 3-3 of FIG. 1.
Figure 4:
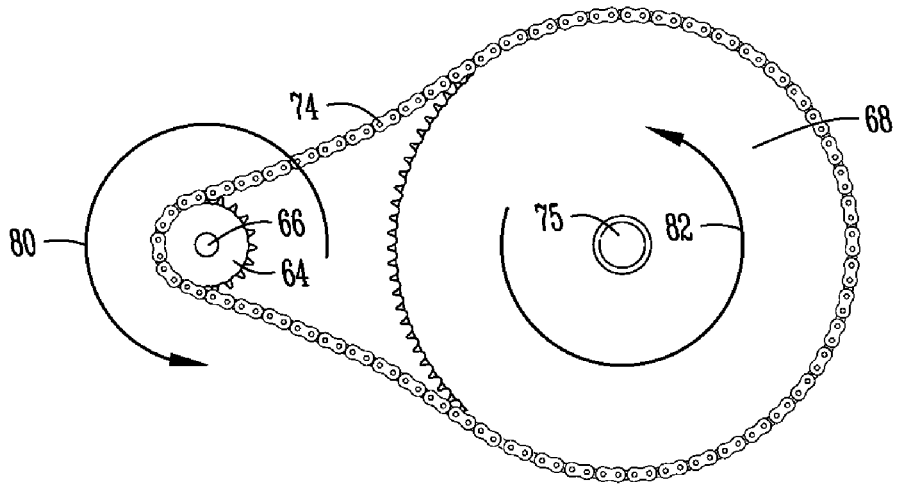
FIG. 4 is a sectional view taken along line 4-4 of FIG. 2.
Figure 5:
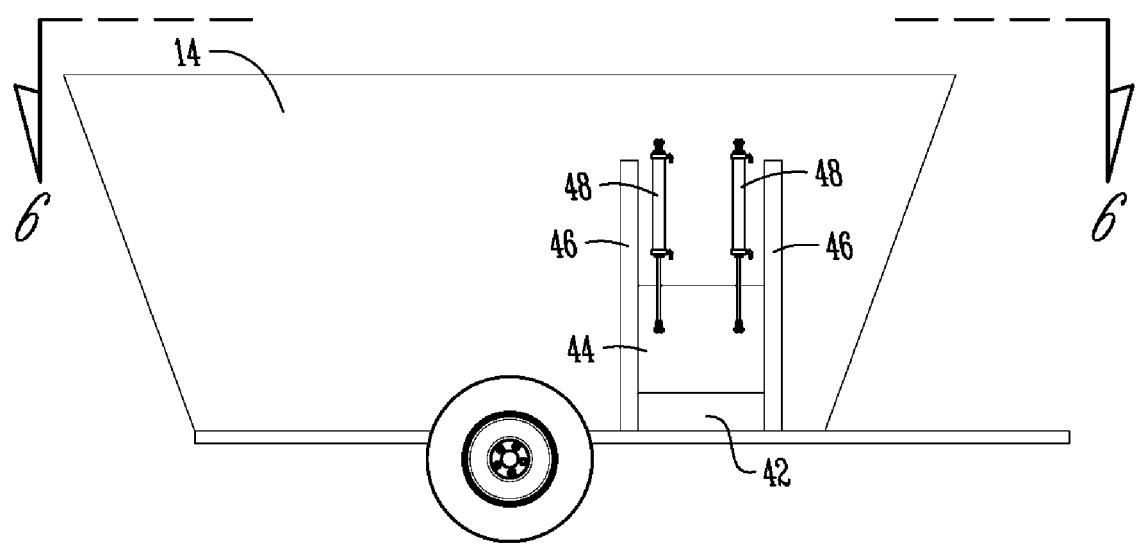
FIG. 5 is an exterior elevational view of the mixer of the present invention.

Referring to FIGS. 1, 3 and 4, a gear box 58 includes a reservoir 60. Extending upwardly from the gear box 58 is a shaft 66 to which a first drive gear 62 is attached and a second drive gear 64 is attached. A first driven sprocket 68 and a second driven sprocket 70 include a first chain 72 and a second chain 74 respectively trained there around. A first shaft 75 and a second shaft 77 attach the gears 68, 70 to the augers 30, 32. Thus, the gear box 58 drives the sprockets 62, 64 and the chains 72, 74 drive the sprockets 68, 70, which in turn drive the augers 30, 32. The augers 30, 32 are driven in the same rotational direction indicated by arrows 67, 69 in FIG. 6. This causes the augers to propel the material in an upward direction from the bottom wall 24 to the top 14. As indicated in FIGS. 3 and 4, the arrows 76, 78, 80 and 82 indicate the direction of movement of the drive auger 62, the driven auger 70, the drive auger 64, and the driven auger 68 respectively.

Figure 7:
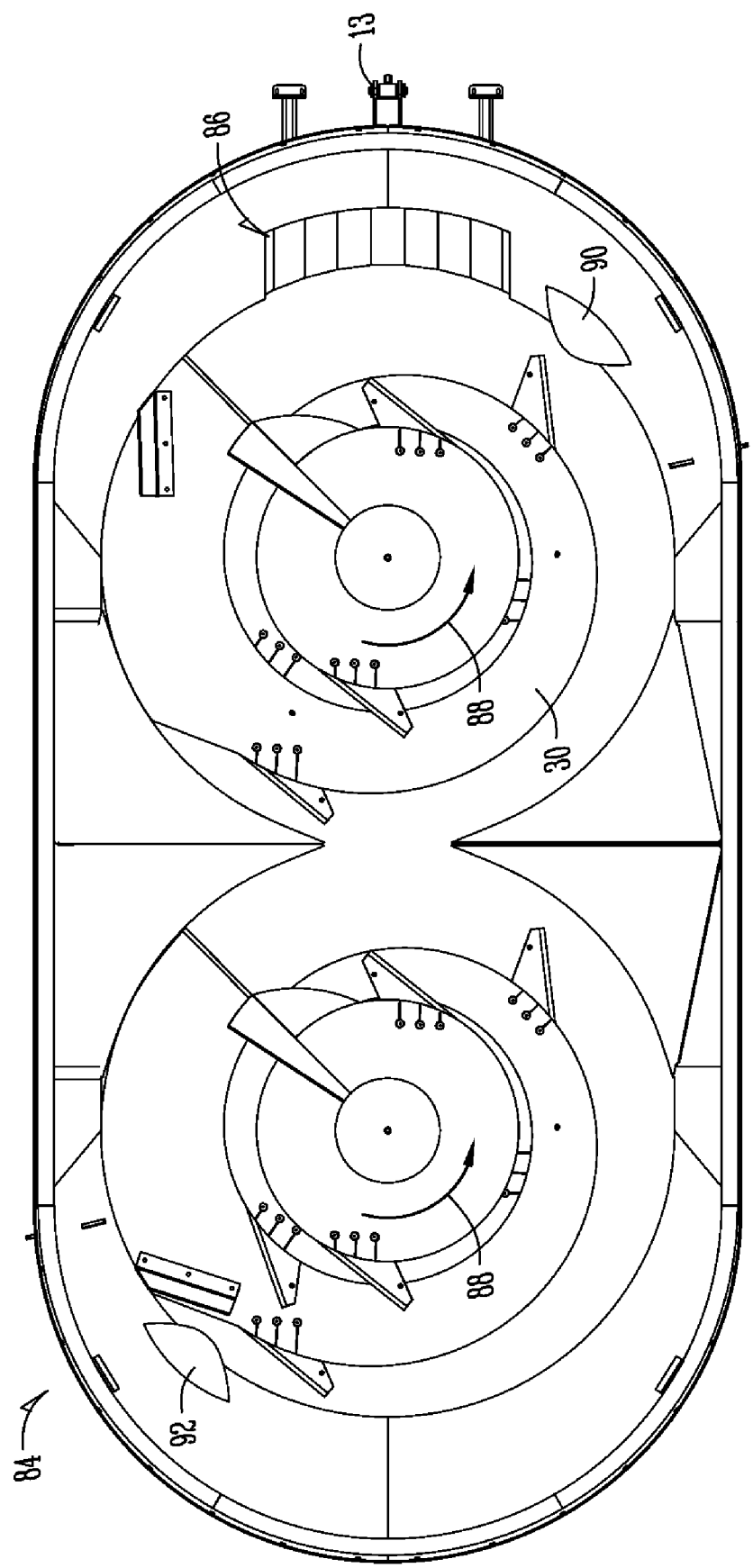
FIG. 7 is a view of a modified form of the present invention placing a deflector on the upstream end of the door opening.

Referring to FIG. 7, a first modified form of the mixer is designated by the numeral 84. This modified form shows a door opening 86 which is adjacent the front of the mixer designated by the numeral 13. The augers are shown driven in a direction indicated by arrows 88 which causes the augers to be driven in a direction which propels the material upwardly. A first deflector 90 is positioned immediately upstream relative to the rotational direction of the auger 30 from the door opening 86. A similar second deflector 92 is positioned 180° therefrom.

Figure 8:
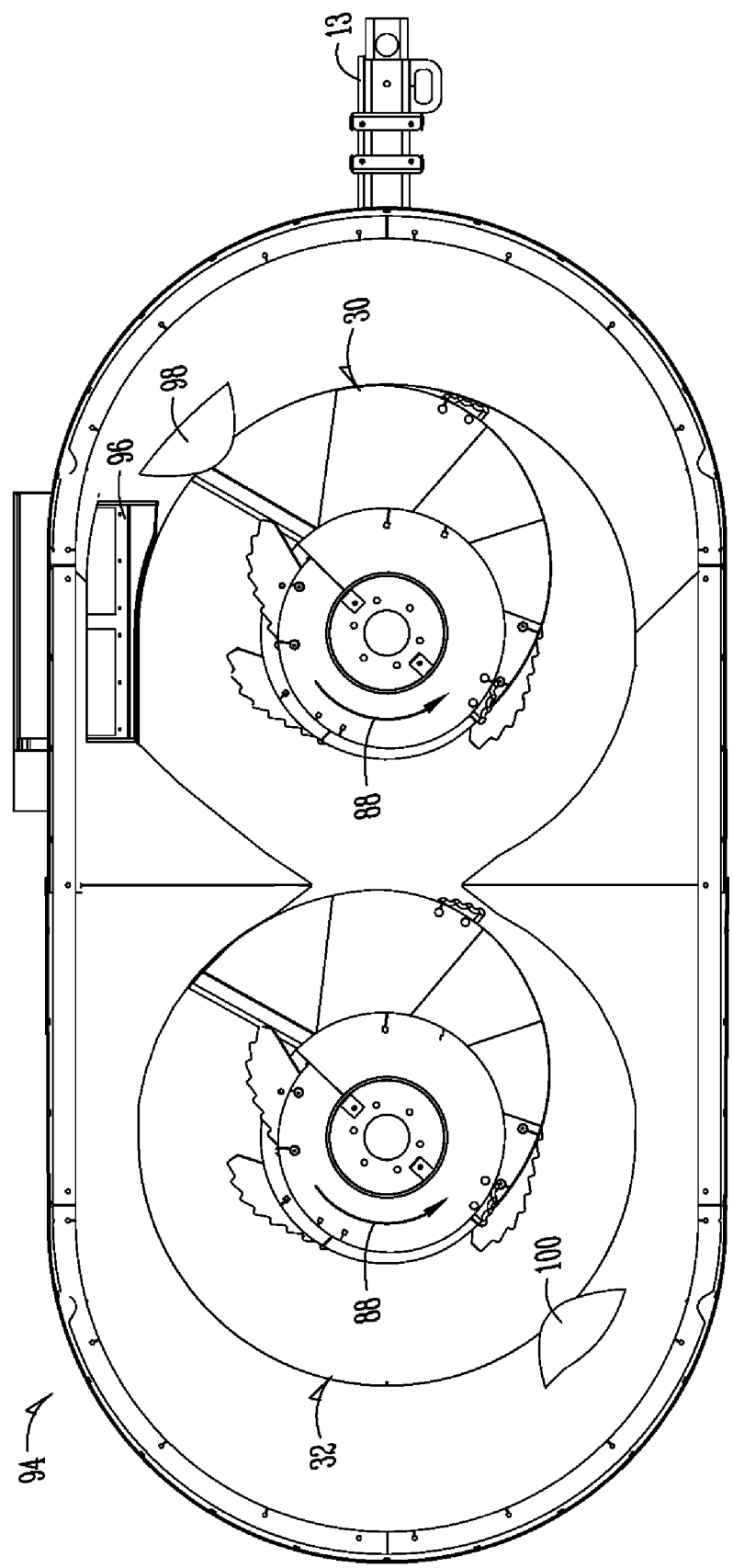
FIG. 8 is a sectional view showing the door opening positioned at the left hand view as viewed from the direction facing the tongue.

Referring to FIG. 8, a modified form indicated by the numeral 94 is shown. FIG. 8 shows a left hand door opening 96 as viewed from the position of facing toward the tongue 13. The first deflector 98 and the second deflector 100 are positioned so that the first deflector 98 is immediately upstream from the door opening 96 relative to the rotational movement of auger 30.

Figure 9:
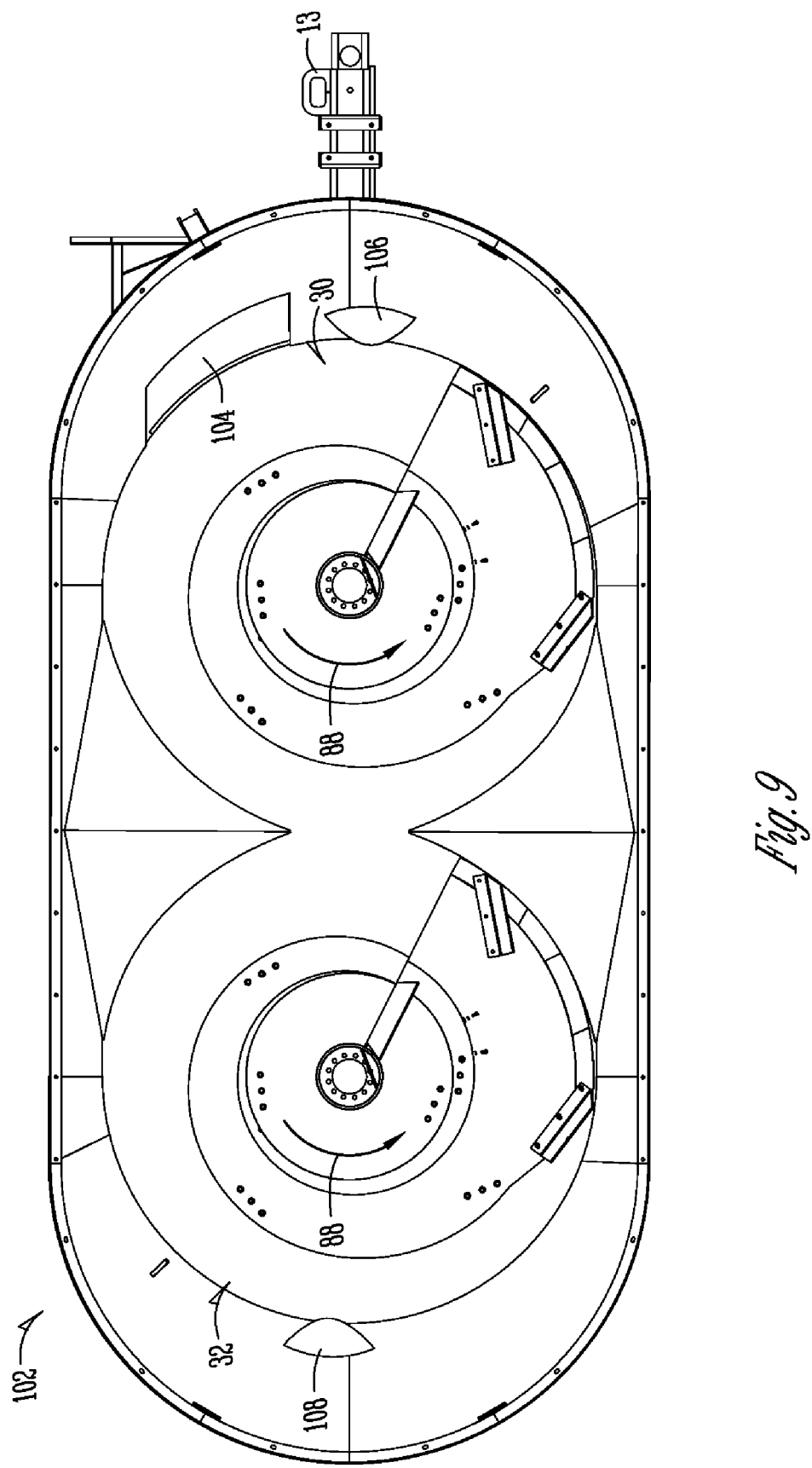
FIG. 9 is a sectional top view showing the location of deflectors when the door opening is located in the front corner of the invention.

A third modified form is shown at 102 in FIG. 9 and reflects a door opening 104 which is positioned at the upper front corner of the mixer housing. Immediately upstream therefrom is a first deflector 106. A similar deflector 108 is positioned 180° therefrom.

In operation, the devices 10, 84, 94, 102 operate with the augers lifting the material upwardly in the mixer housing 12. This upward action is countered by the downward action caused by deflectors 50, 52; 90, 92; 98, 100; and 106, 108. The result is that the mixture is better mixed than in prior art devices, merely by the addition of deflectors. The doors can be placed at various locations within the mixer housing, and preferably the deflectors are located upstream of the door. However, the deflectors may be placed anywhere in the sidewalls. Also, additional deflectors may be used.

Another advantage of the present invention is an improvement in the rate of discharge through discharge opening 42. Positioning the deflectors 50, 52, 90, 92 and 98, 100 improves the rate of discharge through opening 42, especially bulky material that is deflected downwardly toward the discharge opening 42.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A vertical mixer comprising:
   a housing having a continuous sidewall and a bottom wall forming a mixer chamber therein, the housing having a front end, a rear end, and a top end;
   a material within the mixing chamber;
   at least one vertical auger within the housing adapted to rotate about a vertical axis in an upward direction that causes the material within the housing to move toward the top end of the housing;
   mechanism for rotating the at least one vertical auger about the vertical axis in the upward direction;
   a deflector within the housing attached to the sidewall and being positioned to cause downward movement to be imparted to the material towards the bottom wall within the housing in response to the movement of the material towards the top end imparted by the vertical auger; and wherein the housing includes a discharge opening therein having an upstream side and a downstream side relative to the rotation of the auger within the mixing chamber, the deflector being within the housing adjacent the upstream side of the discharge opening.

2. The vertical mixer of claim 1 wherein the housing has the discharge opening to one of the front and rear ends of the mixer housing.

3. The vertical mixer of claim 2 wherein the discharge opening is located in the sidewall of the mixer housing adjacent one of the front end or rear end thereof.

4. The vertical mixer of claim 1 wherein the sidewall of the housing includes at least one baffle, and the deflector is attached to the baffle.

5. The vertical mixer of claim 1, wherein the deflector is located above the discharge opening.

6. The vertical mixer of claim 1, wherein the deflector is located lower than a top surface of the at least one vertical auger.

7. A vertical mixer comprising:
a mixer housing a bottom wall and a continuous sidewall forming a first compartment and a second compartment that are in communication with one another;
an upstanding first auger within the first compartment having a lower end, an upper end, and a flighting thereon;
an upstanding second auger within the second compartment having a lower end, an upper end, and a flighting thereon;
a material to be mixed within the mixing chamber;
mechanism for rotating the first and second augers in directions that cause the respective flightings to lift the material within the first and second compartments in an upward direction from the lower ends to the upper ends of the first and second augers;
a first deflector on the housing in the first compartment deflecting the material downwardly in resistance to the upward lifting of the material caused by the flighting on the first auger;
a second deflector on the housing in the second compartment deflecting the material downwardly in resistance to the upward lifting of the material caused by the flighting on the second auger; and
a discharge opening in the sidewall of the housing within the first compartment, the discharge opening having an upstream side and downstream side relative to rotation of the first auger, the first deflector being positioned immediately upstream from and above the upstream side of the discharge opening to deflect the material downwardly towards the discharge opening as the first auger is rotated.

8. The vertical mixer according to claim 7 wherein a pair of baffles protrudes into the first and second compartments while at the same time providing communication there between, the first and second deflectors being fixed to the first and second baffles respectively.

9. The vertical mixer according to claim 8 wherein the first and second baffles have no openings therein.

10. The vertical mixer according to claim 8 wherein the first and second baffles extend inwardly from the sidewalls of the housing toward one another.

11. The vertical mixer according to claim 7 wherein the first and second deflectors extend downwardly 25° relative to horizontal.

12. The vertical mixer according to claim 7 wherein the first and second deflectors are each plates having upper and lower surfaces, the lower surfaces extending downwardly relative to horizontal from the first and second baffles, respectively.

13. The vertical mixer according to claim 7 wherein the mixing chamber has sidewalls and the first and second baffles are connected to the sidewalls of the mixing chamber.

14. The vertical mixer according to claim 7 wherein the discharge opening is located on the left side of the housing.

15. The vertical mixer according to claim 7 wherein the discharge opening is located on the right side of the housing.

16. The vertical mixer according to claim 7 wherein the discharge opening is located at the front of the mixer.

17. A method for mixing a material within a housing having a front end, a rear end, a top, a sidewall, and a bottom wall forming a mixing compartment therein, wherein the sidewall has a discharge opening, the method comprising:
placing the material within the mixing compartment;
moving the material upwardly toward the top of the housing within the compartment by rotating one or more augers;
deflecting the material downwardly toward the bottom wall of the housing within the compartment with a deflector that is attached to the sidewall of the housing;
positioning the deflector immediately upstream from the discharge opening; and
deflecting the material downwardly towards the discharge opening with the deflector.

18. The method according to claim 17 wherein the sidewall of the housing includes at least one baffle extending into the mixing compartment, the method further comprising positioning the deflector on the baffle.

* * * * *